UNITED STATES PATENT OFFICE.

EDWARD WYLAM, OF SOUTHWARK, COUNTY OF SURREY, ENGLAND.

FOOD FOR ANIMALS.

SPECIFICATION forming part of Letters Patent No. 309,502, dated December 16, 1884.

Application filed April 11, 1882. (No specimens.) Patented in England October 11, 1881, No. 4,412.

*To all whom it may concern:*

Be it known that I, EDWARD WYLAM, a subject of the Queen of Great Britain, and residing at Henry Street, Tooley Street, Southwark, in the county of Surrey, England, have invented an Improved Preparation of Food for Animals, Game, and Poultry, (for which I have obtained a patent in Great Britain, No. 4,412, dated October 11, 1881,) of which the following is a specification.

This invention relates to the manufacture and preparation of a new food for dogs and other animals, and for game and poultry.

In carrying out this invention I will state, as an example, the proportions of the various ingredients employed in the production of a mass of about twenty-four hundred-weight. For this purpose I take about thirteen hundred-weight of wheat-flour, about two hundred-weight of oatmeal, about one hundred-weight of lentil-flour, about three hundred-weight of animal matter—such, for example, as the flesh of animals—about one hundred-weight of the fruit of the date-palm, about two pounds of sulphur, about two pounds of phosphate of lime, about two pounds of a suitable preparation of iron—such, for example, as carbonate of iron—and about one-quarter of a pound of a suitable spice—such, for instance, as essence of peppermint. To the above ingredients or compound I add, in any convenient manner, as much beet-root as will amount to about one-tenth, in weight, of the whole. This beet-root, having been first cleaned, is crushed, pulped, or ground in any suitable manner for the better admixture with the rest of the materials employed. These ingredients are then well mixed together, sufficient water being added to bring the whole to a pasty consistency, after which the paste so obtained is baked and converted into bread, cakes, or biscuits, and when so converted is ready for use.

Some of the above ingredients may be dispensed with, and the proportions of all may be varied—as, for instance, an increased quantity of oatmeal may be used and a less proportion of lentil-flour, but in all cases the improved preparation of food is intended to contain a very considerable portion of beet-root.

It should be understood that by the term "beet-root," as used in this my specification, is intended any varieties of the root known as the *Beta vulgaris*, including that commonly called "mangel-wurzel."

I wish it to be understood that I do not pretend to any claim other than one to a food in which beet-root is used as the essential ingredient, as I am aware that the other ingredients hereinbefore mentioned have been used or proposed before.

What I claim as my invention is—

As a new composition of matter, a loaf or biscuit comprising wheat-flour, lentil-flour, oatmeal, animal matter, dates, sulphur, iron, and spice, combined with beet-root, in substantially the proportions specified.

In testimony whereof I have signed my name to this specification in the presence of two subscribing witnesses.

EDWARD WYLAM.

Witnesses:
WILLIAM ADCOCK, Jr.,
16 *Essex Street, Strand, London, Solicitor's Clerk.*
JEREMIAH EDWARDS,
*Clerk to Messrs. Ridgway Bros.*, 28 *Royal Exchange, E. C., London.*